United States Patent [19]

Hauser, Jr.

[11] 4,399,783
[45] Aug. 23, 1983

[54] INTERFERENCE FIT CYLINDER LINER

[75] Inventor: Herbert J. Hauser, Jr., Waterloo, Iowa

[73] Assignee: Deere & Company, Moline, Ill.

[21] Appl. No.: 356,014

[22] Filed: Mar. 8, 1982

Related U.S. Application Data

[63] Continuation of Ser. No. 139,984, Apr. 14, 1980, abandoned.

[51] Int. Cl.³ .................................................. F02F 1/18
[52] U.S. Cl. ......................... 123/193 CH; 123/193 C; 123/41.84
[58] Field of Search ........ 123/193 R, 193 C, 193 CH, 123/41.67, 41.72, 41.83, 41.84

[56] References Cited

U.S. PATENT DOCUMENTS

| 1,213,340 | 1/1917 | Davis | 123/41.84 |
| 1,342,633 | 6/1920 | Lagersten | 123/41.84 |
| 1,707,679 | 4/1929 | McDowell | 123/41.84 |
| 2,120,004 | 6/1938 | Schwaiger | 123/41.84 |
| 3,363,608 | 1/1968 | Scherenberg et al. | 123/41.84 |
| 3,432,177 | 3/1969 | Colwell | 123/193 R |
| 3,463,056 | 8/1969 | Moore et al. | 123/41.84 |
| 3,882,842 | 5/1975 | Bailey et al. | 123/41.84 |
| 3,942,807 | 3/1976 | Dinger | 123/41.84 |
| 4,253,431 | 3/1981 | Mettig et al. | 123/41.84 |

FOREIGN PATENT DOCUMENTS 839316  3/1939  France ............................. 123/41.83

Primary Examiner—Craig R. Feinberg

[57] ABSTRACT

An interference fit cylinder liner is disclosed for use in an internal combustion engine. The cylinder liner comprises a long hollow cylindrical member open at both ends and having a smooth circular interior surface of uniform diameter. At one end of the cylindrical member is a deflectable thin wall portion having a circumferential convex cross-sectional outer contact surface. This thin wall portion is deflectable inward to form a tight seal with an inner surface of the cylinder head as the cylinder head is mounted to the cylinder block. This tight seal prevents the leakage of combustion gases from the combustion chamber to other parts of the engine.

10 Claims, 2 Drawing Figures

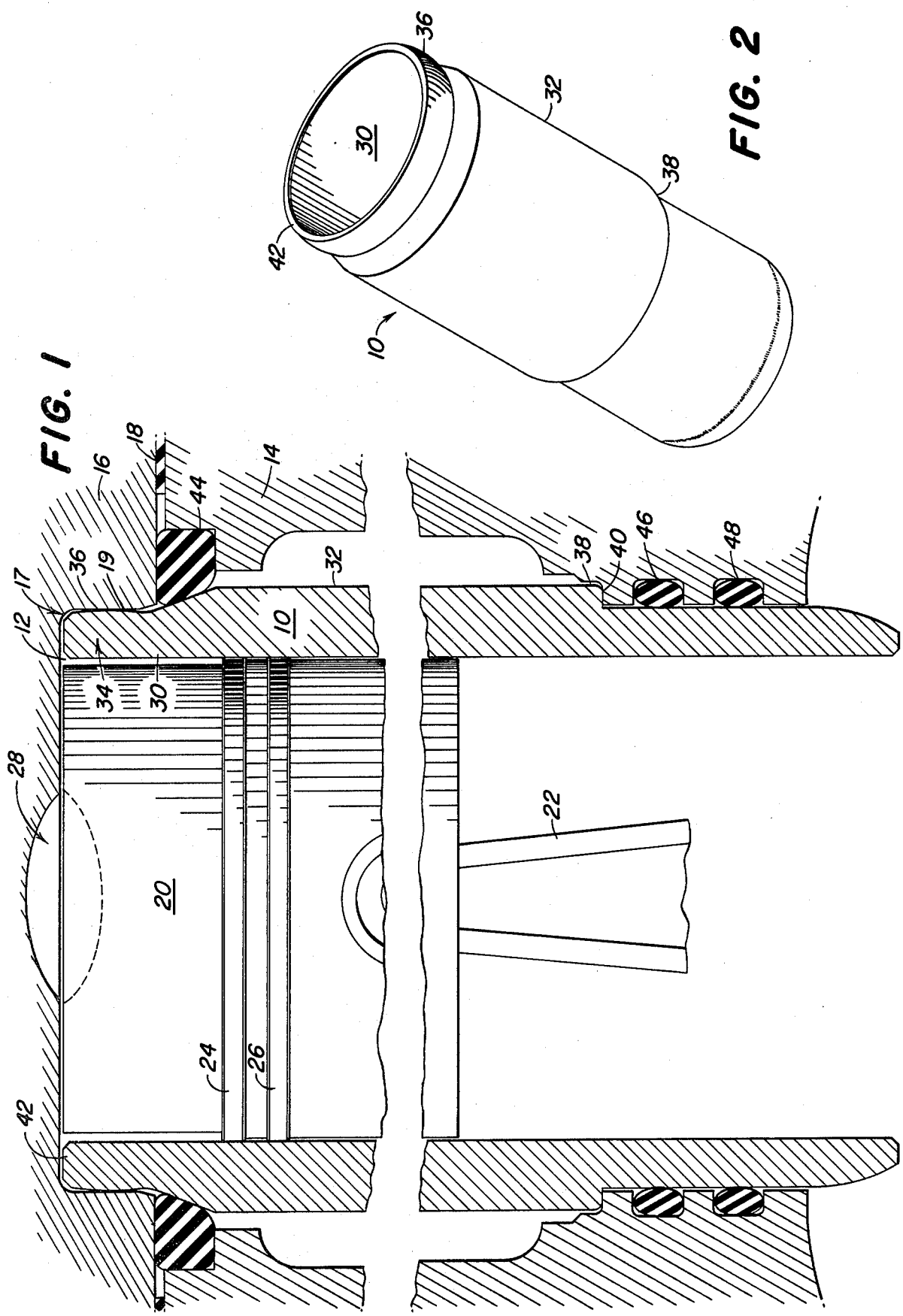

4,399,783

INTERFERENCE FIT CYLINDER LINER

This is a continuation of application Ser. No. 139,984, filed Apr. 14, 1980 now abandoned.

FIELD OF THE INVENTION

This invention relates to an interference fit cylinder liner for an internal combustion engine and more particularly to an interference fit cylinder liner for high compression engines.

BACKGROUND OF THE INVENTION

The use of cylinder liners in engine blocks has been known for many years. The principle purpose of such liners is to reduce the cost of remachining the cylinder bores of an engine after a long period of operation. In addition, such liners aid in sealing the engine head to the engine block and therefore help in preventing combustion gases from leaking into other parts of the engine. Two common examples of conventional cylinder liners are taught in U.S. Pat. No. 2,617,401, issued in 1952 to Rippingille and in U.S. Pat. No. 2,721,542, issued in 1955 to Sheppard. With advances in technology, the internal pressures of combustion engines has increased, and today, it is not uncommon to find engines operating with combustion pressures within the range of 10,000 to 20,000 kilo Pascals.

These higher combustion pressures have proven detrimental to an engine's sealing gaskets and have also reduced the ability of the conventional liners to seal of leaking combustion gases. Such gas leakage is hazardous to an engine in that it affects the operating performance, causes starting difficulty, reduces engine compression and adversely affects the heat transferability of the engine coolant.

Now an interference fit cylinder liner has been invented which is capable of preventing combustion gases from leaking to other parts of an engine. This new cylinder liner is particularly useful in high compression engines, such as high pressure diesel engines, where it is even more desirable to stop combustion gas leakage.

SUMMARY OF THE INVENTION

Briefly, this invention relates to an interference fit cylinder liner for use in an internal combustion engine. This interference fit cylinder liner is constructed of a long hollow cylindrical one-piece member which is open at both ends. The inner surface of the liner is smooth and has a uniform diameter so that a piston can reciprocate therein. At one end of the one-piece cylindrical member is a thin wall portion which contains a circumferential convex cross-sectional contact surface which is capable of being deflected inward. This thin wall portion extends above the top surface of the cylinder block and contacts the inner surface of the engine head. As the engine head, which contains a circular pocket, is mounted to the engine block, the thin wall portion of the cylinder liner is deflected inward. This inward deflection, caused by the thin wall portion contacting the inner circumferential surface of the circular pocket, produces an interference fit between the engine head and the thin wall portion of the cylinder liner. The interference fit is sufficient to prevent the leakage of gases out of the combustion chamber and into other parts of the engine, even when high peak firing pressures are present.

The general object of this invention is to provide an interference fit cylinder liner for an internal combustion engine. A more specific object of this invention is to provide an interference fit cylinder liner for high compression engines.

Another object of this invention is to provide an interference fit cylinder liner which can prevent combustion gases from leaking into other parts of an engine.

Still another object of this invention is to provide an interference fit cylinder liner which will reduce the force needed to clamp the engine head onto the engine block, especially where high peak firing pressures are present.

Other objects and advantages of this invention will become apparent to one skilled in the art based upon the ensuing description.

BRIEF DESCRIPTION OF THE DRAWINGS

FIG. 1 is a cross-sectional view of one embodiment of an interference fit cylinder liner positioned in an engine block with an attached engine head.

FIG. 2 is a perspective view of an interference fit cylinder liner.

DETAILED DESCRIPTION OF THE INVENTION

Referring now to FIG. 1, an interference fit cylinder liner 10 is shown positioned in a cylinder block 14 of an internal combustion engine. The internal combustion engine can be of either the gasoline or diesel type and normally includes the cylinder block 14, a cylinder head 16, a cylinder head gasket 18 and a piston 20. The cylinder head 16 is mounted to the cylinder block 14 by a plurality of mounting bolts (not shown) thereby closing off one end of a cylinder bore 12. As shown, the cylinder head 16 contains a circular pocket 17 having an inner circumferential surface 19 into which a portion of the interference fit cylinder liner 10 extends.

The piston 20, which reciprocates within the cylinder bore 12, is connected in a conventional manner by a connecting rod 22 to a crankshaft, not shown. Surrounding the circumference of the piston 20 are a series of piston rings, two of which are depicted as 24 and 26. These piston rings, 24 and 26, are fitted to the piston 20 and slidably contact an interior surface 30 of the cylinder liner 10. The piston rings 24 and 26 serve to seal in both the combustion gases and the compression pressures produced in a combustion chamber 28 as well as preventing oil contained in the crankcase from leaking into the combustion chamber 28.

The interference fit cylinder liner 10, which can be either a wet or a dry liner, is a long hollow cylindrical member open at both ends as better seen in FIG. 2. This interference fit cylinder liner 10 contains a smooth circular interior surface 30 of substantially uniform diameter and a contour exterior surface 32. As used through this application, the interference fit cylinder liner 10 will be described as being in an upright position within the cylinder block 14. This is strictly for explanation purposes only and should not be viewed as a limitation since the interference fit cylinder liner 10 can also be used in various types of engines having slanted or horizontally aligned cylinder bores.

At the upper end of the interference fit cylinder liner 10 is a thin wall portion 34 having a circumferential convex cross-sectional contact surface 36. The shape of this contact surface 36 can be altered to include a spherical surface or a curved sector surface. It is preferred that a bowed or geometrically arc-shaped configuration be used in order to obtain a good seal. The thin wall portion 34, which is preferably resilient within its elastic limit, can be deflected inward by mounting the cylinder head 16 to the cylinder block 14. As the inner circumferential surface 19 of the cylinder head 16 is forced down over the thin wall portion 34, an interference fit is established. This interference fit is also self-energized by the combustion pressures within the combustion chamber 28. As the pressure increases, due to detonation of the fuel mixture, the thin walled portion is further forced against the cylinder head 16. This action creates a tighter seal and is beneficial in preventing combustion gases from leaking from the combustion chamber 28 to other parts of the engine. In particular, the interference fit cylinder liner 10 can prevent the leakage of combustion gases in high compression engines and in high pressure diesel engines. The leakage of such combustion gases in an engine is detrimental in that it noticeably affects the engine performance. Starting difficulties, reduced engine compression and diminished heat transferability by the engine coolant are but some of the frequently encountered problems.

The interference fit cylinder liner 10 is tightly disposed in the cylinder block 14 and is vertically retained in position by a shoulder 38 which abuts a seat 40 of the cylinder block 14. The shoulder 38 is located on the exterior surface 32 of the interference fit cylinder liner 10. When the shoulder 38 is in contact with the seat 40, the thin wall portion 34 will be above the upper surface of the cylinder block 14. This position is important because the circular pocket 17 of the cylinder head 16 must fit over the extending thin wall portion 34 and preferably does not touch a top surface 42 of the interference fit cylinder liner 10. If the cylinder head 16 contacted the top surface 42, it could mushroom the interference fit cylinder liner 10, thereby restricting the reciprocating action of the piston 20. Such action could also cause the interference fit cylinder liner 10 to buckle or be deformed out of round, thereby interfering with the piston 20 and the piston rings 24 and 26.

In addition to the interference fit cylinder liner 10, a sealing means 44, such as an elastomer ring, can be positioned between the cylinder block 14 and the cylinder head 16. This sealing means 44 should contact the exterior surface 32 of the interference fit cylinder liner 10 just below the thin wall portion 34. This sealing means 44 will provide a backup to prevent leakage of any combustion gases which may seep past the contact surface 36. The sealing means 44 can be any high temperature elastic or rubber-like material. These include prefabricated or liquid room temperature vulcanizing gaskets such as sold by Dow Corning or General Electric.

Both the interference fit cylinder liner 10 and the cylinder head 16 can contain chamfer corners to assist in positioning the cylinder head 16 over the cylinder liner 10. Other minor variations, such as the use of O-ring seals 46 and 48, as shown contacting the lower extremities of the exterior surface 32 of the interference fit cylinder liner 10, can be utilized if desired.

EXAMPLE

For a standard size diesel engine having a peak firing pressure between 3,500–21,000 kilo Pascals, a firing temperature between 1,500°–2,500° F. and a cylinder bore of approximately 130 millimeters, an interference fit cylinder liner 10 of the following dimensions can be used. The interference fit cylinder liner 10 can be approximately 7–10 mm in wall thickness with the thin wall portion 34 being a millimeter or two less. The interference fit between the cylinder head 16 and the thin wall portion 34 can be about 0.05–0.25 mm, preferably 0.2–0.2 mm. The length and diameter of the interference fit cylinder liner 10 will depend upon the piston stroke and diameter. The circumferential convex cross-sectional contact surface 36 can be about 1–2 mm wide and should be located about 5 mm down from the top surface 42.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. In an internal combustion engine having a cylinder block with an opening formed therein, a cylinder liner fitted throughout a substantial portion of its entire length in said opening of said cylinder block to form a cylindrical bore, and a cylinder head mounted to said cylinder block to close one end of said cylindrical bore, said cylinder head having a circular pocket with a circumferential side surface into which extends a portion of said cylinder liner, wherein the improvement comprises:
    (a) an interference fit cylinder liner including a hollow cylindrical member with an interior surface of substantially uniform diameter and a contoured exterior surface, said cylindrical member having a thin wall formed at an end thereof which has a contact surface and contact free surfaces, said contact surface having a circumferential convex cross-sectional profile that extends above said cylinder block into said circular pocket of said cylinder head, said contact surface being deflected inward upon contact with said circumferential side surface of said circular pocket as said cylinder head is mounted onto said cylinder block and said contact free surfaces being spaced apart from adjacent surfaces of said circular pocket forming a clearance which is free of intermediate members therebetween; and
    (b) sealing means for preventing combustion gases from passing between said cylinder block and said cylinder head, said sealing means contacting said exterior surface of said cylindrical member adjacent to said contact surface.

2. An interference fit cylinder liner comprising a hollow cylindrical member having an interior surface of substantially uniform diameter and a contoured exterior surface, said cylindrical member further having a thin circumferential wall approximate an end thereof with a contact surface and contact free surfaces, said contact surface having a convex cross-sectional profile which is deflected inward upon contact with an annular surface of a recess formed in a cylinder head and said contact free surfaces being spaced apart from adjacent surfaces of said recess forming a clearance which is free of intermediate members therebetween.

3. The interference fit cylinder liner of claim 2 wherein said thin wall is resilient.

4. An interference fit cylinder liner comprising a hollow cylindrical member having a thin circumferential wall approximate an end thereof, said thin circumferential wall having a contact surface and contact free surfaces, said contact surface having a convex cross-sectional profile which is deflected inward upon contact with an annular surface of a recess formed in a cylinder head and said contact free surfaces being spaced apart from adjacent surfaces of said recess forming a clearance which is free of intermediate members therebetween.

5. The interference fit cylinder liner of claim 4 wherein said thin circumferential wall has a smaller outside diameter than another portion of an exterior surface of said cylindrical member.

6. The interference fit cylinder liner of claim 4 wherein said thin circumferential wall is resilient.

7. In an internal combustion engine having a cylinder block with at least one cylindrical bore formed therein and a cylinder head mounted to said cylinder block to close one end of said cylindrical bore, said cylinder head having a circular pocket formed therein with a circumferential side surface, wherein the improvement comprises:
an interference fit cylinder liner including a hollow cylindrical member disposed in said cylindrical bore, said cylindrical member having a contoured exterior surface with a thin wall formed at an end thereof, said thin wall having a smaller outside diameter than another portion of said exterior surface of said cylindrical member and having a contact surface and contact free surfaces, said contact surface having a convex cross-sectional profile that extends above said cylinder block into said circular pocket, said contact surface being deflected inward upon contact with said circumferential side surface of said circular pocket as said cylinder head is mounted onto said cylinder block and said contact free surfaces being spaced apart from adjacent surfaces of said circular pocket forming a clearance which is free of intermediate members therebetween.

8. The interference fit cylinder liner of claim 7 wherein said thin wall is resilient.

9. The interference fit cylinder liner of claim 7 wherein said contact surface of said thin wall has a spherical cross-sectional configuration.

10. The liner of claim 7 wherein said thin wall is self-energized into a sealing position with said circumferential side surface of said cylinder head by internal combustion pressures.

* * * * *